(12) United States Patent
Mathew et al.

(10) Patent No.: US 8,031,420 B2
(45) Date of Patent: Oct. 4, 2011

(54) FREQUENCY-BASED APPROACH FOR DETECTION AND CLASSIFICATION OF HARD-DISC DEFECT REGIONS

(75) Inventors: George Mathew, San Jose, CA (US); Yang Han, Santa Clara, CA (US); Shaohua Yang, San Jose, CA (US); Zongwang Li, San Jose, CA (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/707,820

(22) Filed: Feb. 18, 2010

(65) Prior Publication Data

US 2011/0199699 A1    Aug. 18, 2011

(51) Int. Cl.
G11B 27/36 (2006.01)
G11B 5/02 (2006.01)
(52) U.S. Cl. .......................................... 360/31; 360/25
(58) Field of Classification Search .................. None
See application file for complete search history.

(56) References Cited

U.S. PATENT DOCUMENTS

| | | | |
|---|---|---|---|
| 6,175,459 B1 | 1/2001 | Tomita | |
| 6,414,806 B1 | 7/2002 | Gowda et al. | |
| 6,665,134 B2 | 12/2003 | Ottesen et al. | |
| 6,671,111 B2 | 12/2003 | Ottesen et al. | |
| 7,237,173 B2 | 6/2007 | Morita et al. | |
| 7,646,556 B1 * | 1/2010 | Kose et al. | 360/31 |
| 7,679,853 B2 * | 3/2010 | Song et al. | 360/59 |
| 2002/0048108 A1 | 4/2002 | Chu et al. | |
| 2008/0104486 A1 | 5/2008 | Kanaoka | |
| 2008/0262643 A1 | 10/2008 | Creigh et al. | |
| 2009/0235146 A1 | 9/2009 | Tan et al. | |
| 2009/0268848 A1 | 10/2009 | Tan et al. | |
| 2009/0271670 A1 | 10/2009 | Tan et al. | |
| 2010/0226033 A1 | 9/2010 | Tan et al. | |

* cited by examiner

*Primary Examiner* — Daniell L Negron
*Assistant Examiner* — Regina N Holder
(74) *Attorney, Agent, or Firm* — Mendelsohn, Drucker & Associates, P.C.; Steve Mendelsohn

(57) ABSTRACT

In a hard-disc drive read channel, frequency-based measures are generated at two different data frequencies (e.g., 2T and DC) by applying a transform, such as a discrete Fourier transform (DFT), to signal values, such as ADC or equalizer output values, corresponding to, e.g., a 2T data pattern stored on the hard disc. The frequency-based measures are used to detect defect regions on the hard disc and/or to classify defect regions as being due to either thermal asperity (TA) or drop-out media defect (MD).

23 Claims, 4 Drawing Sheets

FREQUENCY-BASED APPROACH FOR DETECTION AND CLASSIFICATION OF HARD-DISC DEFECT REGIONS

CROSS-REFERENCE TO RELATED APPLICATIONS

The subject matter of this application is related to the subject matter of U.S. patent application Ser. No. 11/319,319 filed Dec. 28, 2005 and U.S. patent application Ser. No. 12/111,255 filed Apr. 29, 2008, the teachings of both of which are incorporated herein by reference in their entirety.

BACKGROUND

1. Field of the Invention

The present invention relates to hard-disc drives, and, in particular, to techniques for detecting defect regions in hard disc drives and classifying whether the defect regions correspond to thermal asperity or media defect.

2. Description of the Related Art

This section introduces aspects that may help facilitate a better understanding of the invention. Accordingly, the statements of this section are to be read in this light and are not to be understood as admissions about what is prior art or what is not prior art.

An ideal hard disc of a hard-disc drive has a data-storage surface that is perfectly flat and of perfectly uniform material composition. In reality, however, hard discs are not perfectly flat and have varying material composition. As a result of this, as well as for manufacturing reasons, different types of defects can be present on hard discs. It can be difficult to recover data read from defect regions, and the intensity of difficulty depends on the type of defect. In drop-out type defect regions, the amplitude of the analog read-head output signal is significantly lower than the read-head output signal amplitude for normal regions that are relatively flat and of relatively uniform material composition. Data written on such defect regions may be recovered if the read-head output signal is appropriately amplified and conditioned by the electronics that processes the read-head output signal. In this document, we refer to such drop-out type defects as "media defects" (MD). It is desirable to determine the locations of MD regions on hard discs so that the signals read from those MD regions can be properly processed to recover the data accurately.

Sometimes, the topography of a hard-disc region is so varied that the read head will come into physical contact with certain regions when the read head is positioned over these regions of the spinning hard disc due to the asperities present on the disc. Such regions are referred to as thermal asperity (TA) regions, due to the frictional heat generated from the physical contact between the read head and the varied hard disc. It is desirable to determine the locations of TA regions on hard discs so that those regions can be avoided during both data write and data read operations to prevent damage to the read head.

Current and older hard-disc drives employed MR (magneto resistive) read heads or GMR (giant MR) read heads. For such read heads, read-head output signals corresponding to MD regions have amplitudes that are significantly smaller than the signal amplitudes for normal regions, while read-head output signals corresponding to TA regions have amplitudes that are significantly greater than the normal-region signal amplitudes due to a shift in baseline resulting from the TA effect. As such, MD regions can be located on a hard disc of a hard-disc drive employing an MR/GMR read head by looking for lower-than-normal signal-amplitude regions, while TA regions can be located on the hard disc by looking for significant increases in signal baseline compared to normal signal-amplitude regions.

Newer hard-disc drives employ TMR (tunneling MR) read heads. For TMR read heads, TA regions can be mistaken for MD regions because read-head output signals corresponding to both MD regions and TA regions have amplitudes that are significantly smaller than the signal amplitudes for normal regions. As such, the conventional signal-processing techniques used to detect and classify MD and TA regions for hard-disc drives employing MR/GMR read heads cannot be used to detect and classify MD and TA regions for hard-disc drives employing TMR read heads.

SUMMARY

In one embodiment, the present invention is a machine-implemented method for detecting or classifying a defect region on a hard disc. Signal values are received corresponding to data stored on the hard disc in a data pattern having a first data frequency. A first measure is generated corresponding to the first data frequency, and a second measure is generated corresponding to a second data frequency different from the first data frequency. The defect region is detected or classified based on the first measure and the second measure.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
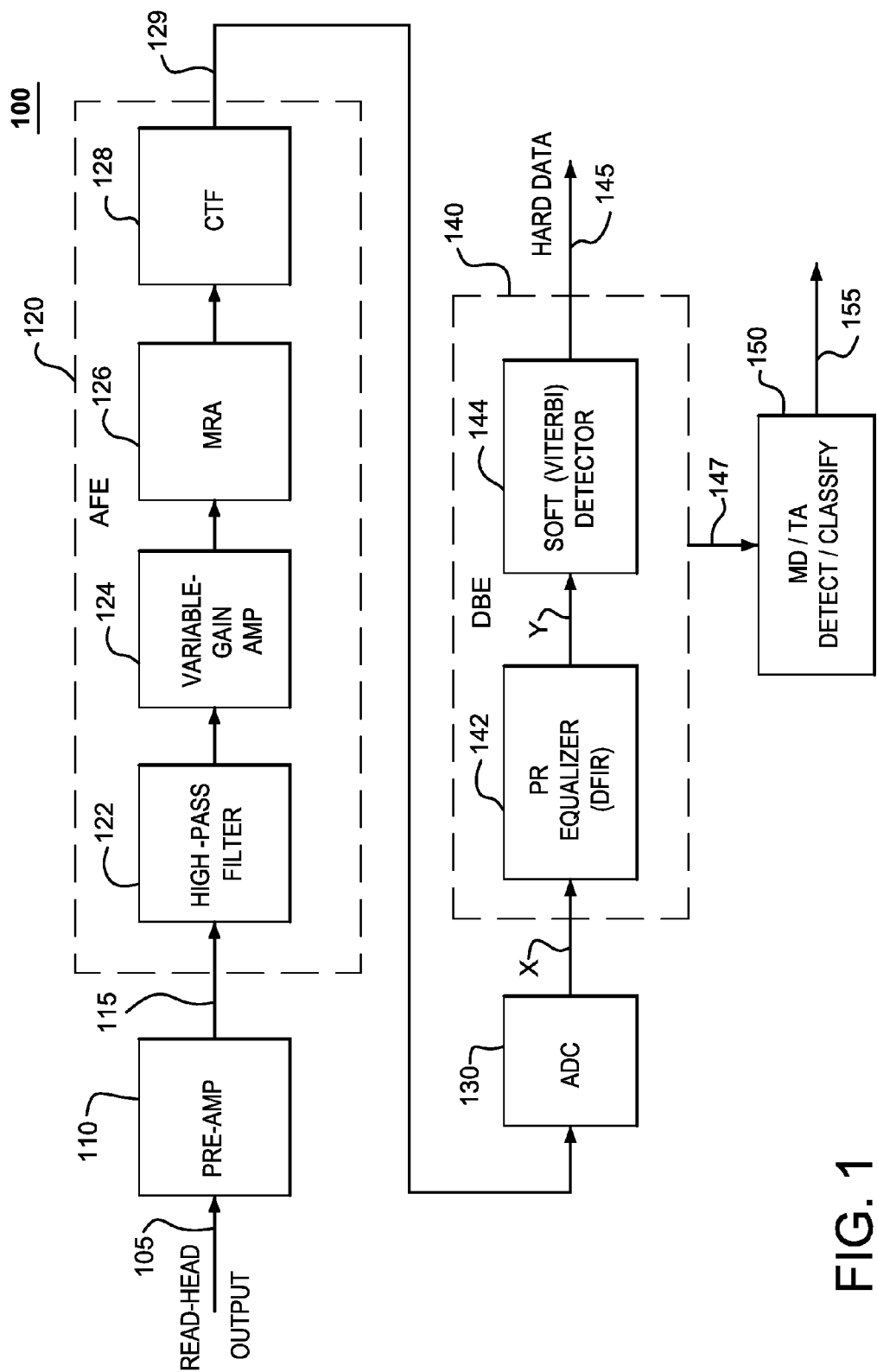
FIG. 1 shows a high-level block diagram of a read channel for a hard-disc drive employing a tunneling magneto resistive (TMR) read head, according to one embodiment of the present invention.

FIG. 1 shows a high-level block diagram of a read channel 100 for a hard-disc drive employing a tunneling magneto resistive (TMR) read head, according to one embodiment of the present invention. The (conventional) main signal-processing path of read channel 100 receives analog read-head output signal 105 from the TMR read head (not shown) and outputs binary (hard-decision) output data signal 145.

As shown in FIG. 1, read channel 100 includes pre-amplifier 110, analog front end (AFE) 120, analog-to-digital converter (ADC) 130, and digital back end (DBE) 140. Pre-amplifier 110 amplifies and conditions read-head output signal 105 to ensure that the signal amplitude and frequency components are within specified ranges for processing by AFE 120, which further amplifies and conditions the pre-amplified signal 115 from pre-amplifier 110. ADC 130 digitizes the AFE output signal 129 to produce multi-bit digital signal X (consisting of ADC output samples x[n]) for digital signal processing by DBE 140 that generates binary output data signal 145.

As represented in FIG. 1, AFE 120 includes high-pass filter 122, variable-gain amplifier 124, magneto resistive asymmetry (MRA) compensation module 126, and continuous-time low-pass filter 128, while DBE 140 includes partial-response (PR) equalizer 142 and soft (e.g., Viterbi) detector 144. Of particular interest to the present invention, PR equalizer 142 receives digitized ADC output signal X from ADC 130 and generates multi-bit equalized signal Y (consisting of equalizer output samples y[n]), which soft detector 144 processes to generate binary output data signal 145. PR equalizer 142 can be, but does not have to be, implemented as a digital finite impulse response (DFIR) filter.

In addition, TMR read channel 100 includes media defect (MD)/thermal asperity (TA) detection and classification subsystem 150, which receives and processes signal 147 from DBE 140 to detect the locations of defect regions on the hard disc and classify each detected defect region as being either an MD region or a TA region, which information is represented in signal 155. In one implementation, signal 147 is the ADC output signal X generated by ADC 130. In another implementation, signal 147 is the equalized signal Y generated by PR equalizer 142.

Figure 2:
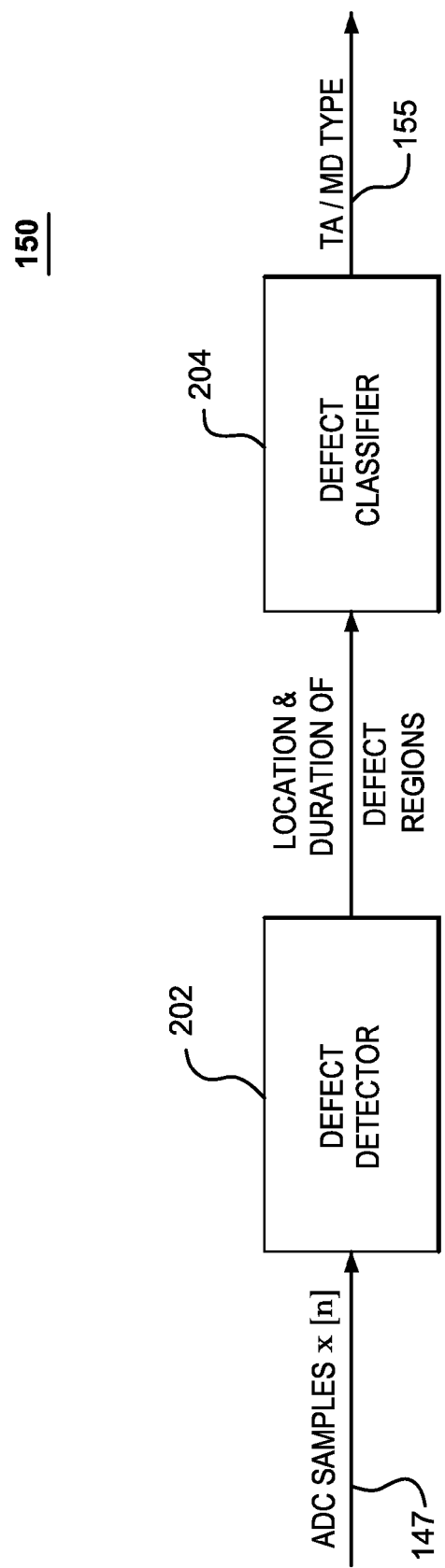
FIG. 2 shows a high-level block diagram of the MD/TA detection and classification (D&C) subsystem of FIG. 1 according to one possible implementation of the present invention.

FIG. 2 shows a high-level block diagram of MD/TA detection and classification (D&C) subsystem 150 of FIG. 1 according to one possible implementation of the present invention. In this particular implementation, D&C subsystem 150 processes ADC output samples x[n] of signal X of FIG. 1 to detect and classify defect regions on a hard disc. In particular, D&C subsystem 150 includes defect detector 202, which processes the ADC output samples x[n] to detect the location and duration of defect regions, and defect classifier 204, which processes statistics generated by defect detector 202 to classify each detected defect region as being either an MD region or a TA region.

Figure 3:
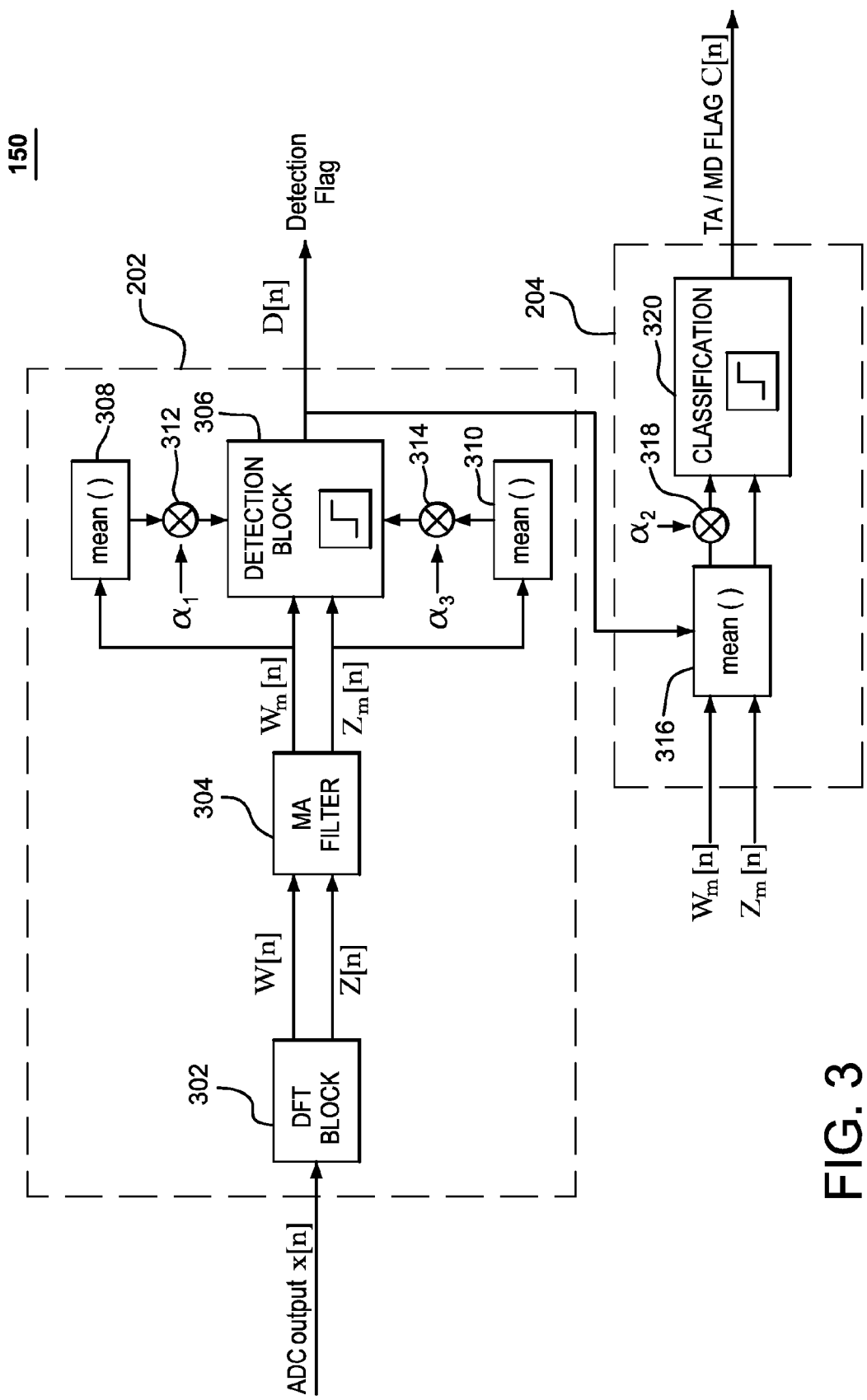
FIG. 3 shows a more-detailed block diagram of the MD/TA D&C subsystem of FIGS. 1 and 2.

FIG. 3 shows a more-detailed block diagram of MD/TA D&C subsystem 150 of FIGS. 1 and 2. As shown in FIG. 3, defect detector 202 of FIG. 2 includes discrete Fourier transform (DFT) block 302, moving average (MA) filter 304, mean generators 308 and 310, scalar multipliers 312 and 314, and detection block 306, while defect classifier 204 of FIG. 2 includes mean generator 316, scalar multiplier 318, and classification block 320.

To perform MD/TA detection and classification, data is written to the hard disc using a fixed MT data pattern having a period of 2MT, where M is an integer and T is the duration of one bit. For example, in one implementation, M=2 and the corresponding 2T data pattern (e.g., [11001100 . . . ]) having a period of 4T is written to the hard disc. In other implementations, M can have a value other than 2. DFT block 302 performs two different DFT functions in parallel on the ADC output samples x[n] to generate two different DFT output samples W[n] and Z[n], where DFT output sample W[n] corresponds to the MT data frequency and DFT output sample Z[n] corresponds to a data frequency different from the MT data frequency. For example, in one possible implementation in which the hard-drive data has a 2T data pattern, DFT output sample W[n] is based on the 2T data frequency, and DFT output sample Z[n] is based on the DC (i.e., 0) data frequency as given by Equations (1) and (2) as follows:

$$W[n]=\text{sqrt}\{|x[n-4]-x[n-2]+x[n]-x[n+2]|^2+|x[n-3]-x[n-1]+x[n+1]-x[n+3]|^2\} \quad (1)$$

$$Z[n]=|x[n-4]+x[n-3]+x[n-2]+x[n-1]+x[n]+x[n+1]+x[n+2]+x[n+3]| \quad (2)$$

To simplify hardware implementation, in one possible implementation, the computation of 2T frequency DFT sample W[n] can be simplified as given by Equation (3) as follows:

$$W[n]=|x[n-4]-x[n-2]+x[n]-x[n+2]|+|x[n-3]-x[n-1]+x[n+1]-x[n+3]| \quad (3)$$

Those skilled in the art will understand that DFT output samples W[n] and Z[n] could alternatively be generated using sets of ADC output samples x[n] other than the set of eight samples shown in Equations (1) and (2), and these DFT samples may be computed using fewer or more than 8 samples. In addition, the DFT output sample Z[n] can be based on a data frequency other than the DC data frequency.

Figure 4:
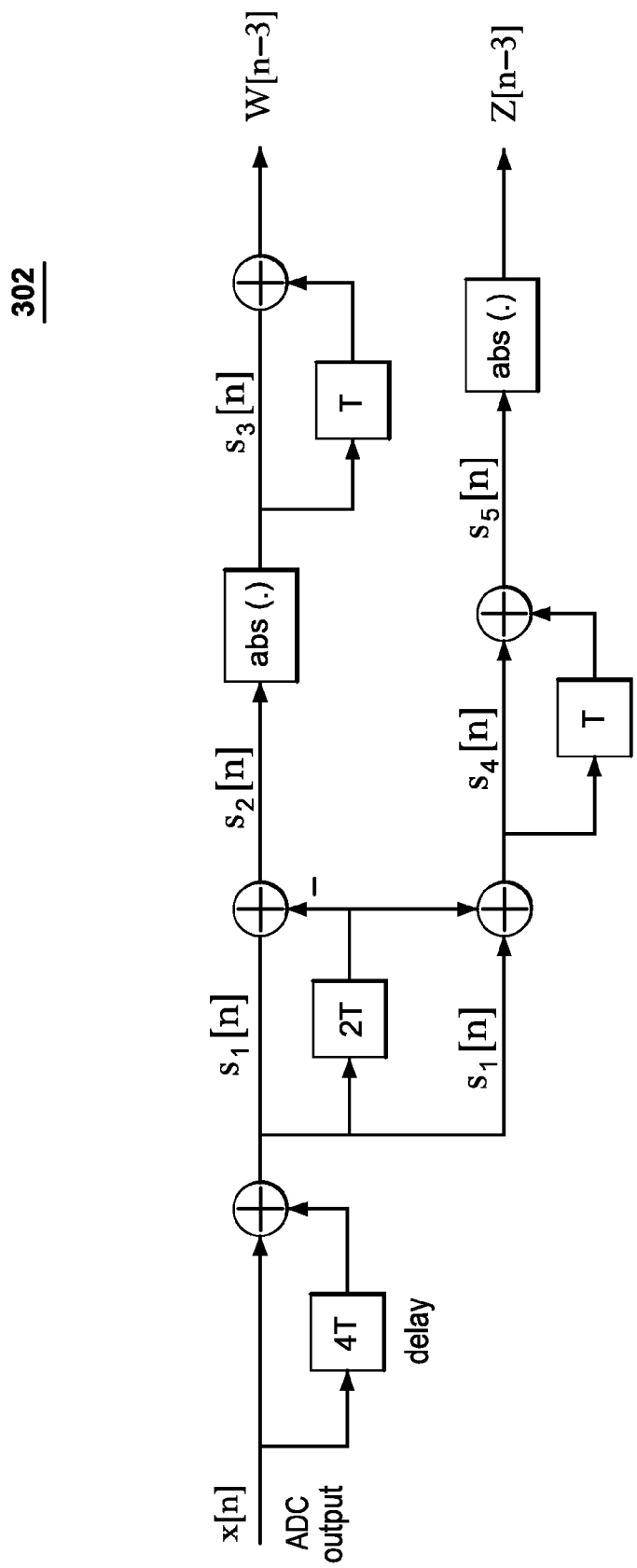
FIG. 4 shows one possible hardware implementation of the DFT block of FIG. 3.

FIG. 4 shows one possible hardware implementation of DFT block 302 of FIG. 3. Note that, since Equations (1) and (2) use ADC output samples x[i] before and after sample x[n], the DFT output samples shown in FIG. 4 corresponding to input sample x[n] are W[n−3] and Z[n−3].

Referring again to FIG. 3, moving average (MA) filter 304 generates local averages $W_m[n]$ and $Z_m[n]$ of the DFT output samples W[n] and Z[n] according to Equations (4) and (5), respectively, as follows:

$$W_m[n] = \sum_{i=0}^{N_1-1} W[n-i] \quad (4)$$

$$Z_m[n] = \sum_{i=0}^{N_1-1} Z[n-i] \quad (5)$$

where $N_1$ is a suitable number such as 4 or 8. Note that, for computational efficiency, local averages $W_m[n]$ and $Z_m[n]$ are scaled averages because the sums are not divided by $N_1$.

Mean generator 308 generates defect-free average $W_{m,d}$ according to Equation (6) as follows:

$$W_{m,d} \leftarrow W_{m,d} + \gamma(W_m[n] - W_{m,d}) \quad (6)$$

where the local averages $W_m[n]$ used in Equation (6) correspond to defect-free regions. Similarly, mean generator 310 generates defect-free average $Z_{m,d}$ according to Equation (7) as follows:

$$Z_{m,d} \leftarrow Z_{m,d} + \gamma(Z_m[n] - Z_{m,d}) \quad (7)$$

where the local averages $Z_m[n]$ used in Equation (7) correspond to defect-free regions. Note that defect-free averages $W_{m,d}$ and $Z_{m,d}$ are updated in Equations (6) and (7) only for normal (i.e., defect-free) regions of the hard disc. The weight factor $\gamma$ is set to a suitable value less than one and typically close to zero (e.g., <0.1). In one implementation, the weight factor $\gamma$ is 0.05. The defect-free averages $W_{m,d}$ and $Z_{m,d}$ are initialized using suitable seed values, which are 400 and 10, respectively, in one possible implementation. Exact values for these and other parameters can be determined via simulation using data from actual hard drives. To support high-data-rate operation, the updating of defect-free averages $W_{m,d}$ and $Z_{m,d}$ can be done once in 4 bits, resulting in a quarter-rate implementation compared to the full-rate implementation described in Equations (6) and (7) where updating is done every bit.

Scalar multipliers 312 and 314 scale the defect-free averages $W_{m,d}$ and $Z_{m,d}$ by specified scale factors $\alpha_1$ and $\alpha_3$, respectively.

The resulting scaled, defect-free averages $\alpha_1 W_{m,d}$ and $\alpha_3 Z_{m,d}$ as well as the local averages $W_m[n]$ and $Z_m[n]$ are applied to detection block 306, which generates binary detection flag D[n] according to Equation (8) as follows:

$$D[n] = \begin{cases} 1 & \text{if } OR(W_m[n] \le \alpha_1 \cdot W_{m,d}, Z_m[n] > \alpha_3 \cdot Z_{m,d}) \\ 0 & \text{otherwise} \end{cases} \quad (8)$$

where $0<\alpha_1<1$ and $\alpha_3>1$. In other words, if either of the two conditions specified in the first line of Equation (8) is true, then a defect region is detected (i.e., $D[n]=1$). Otherwise, if neither of those two conditions are satisfied, then a defect region is not detected (i.e., $D[n]=0$). In one implementation, the scale factors $\alpha_1$ and $\alpha_3$ are set to 0.5 and 5.0, respectively.

For normal (i.e., defect-free) regions, the local average $W_m[n]$ for the 2T DFT component is substantially equal to the defect-free average $W_{m,d}$ for that component, and similarly the local average $Z_m[n]$ for the DC DFT component is substantially equal to the defect-free average $Z_{m,d}$ for that component. As such, for a normal region, neither inequality in Equation (8) will be satisfied. On the other hand, for defect regions (i.e. MD regions or TMR-TA regions), the local average $W_m[n]$ for the 2T DFT component will be substantially smaller than the defect-free average $W_{m,d}$ for that component, while the local average $Z_m[n]$ for the DC DFT component might or might not be substantially larger than the defect-free average $Z_{m,d}$ for that component. In defect regions corresponding to TMR-TA, strength of DC DFT component will be larger than that for defect-free regions since occurrence of TA results in a readback signal with a broader spectrum compared to defect-free regions where the signal spectrum contains only the 2T frequency. As such, for a defect region, at least one inequality in Equation (8) will be satisfied. Further, if this MD/TA detector is used to process the signal from GMR heads where TA manifests as significant shift in signal baseline, then the second inequality in Equation (8) will be satisfied during defect regions containing GMR-TA, while the first inequality might or might not be satisfied.

When a defect region is detected by detection block 306, mean generator 316 of defect classifier 204 begins to generate defect averages $W_{m,c}$ and $Z_{m,c}$ according to Equations (9) and (10), respectively, as follows:

$$W_{m,c} = W_m[n] + W_m[n+1] + \ldots + W_m[n+L_m-1] \quad (9)$$

$$Z_{m,c}[n] = Z_m[n] + Z_m[n+1] + \ldots + Z_m[n+L_m-1] \quad (10)$$

where:
n is such that $D[n+i]=1$ for $i=0,1,\ldots,L_m-1$,
$L_m=\min\{L_d, L_{max}\}$, $L_{max}=64$, and
$L_d$ is the length of the detected defect in number of bits.
Depending upon implementation ease, the quantity $L_{max}$ may be set to a fixed length such as 64 or it can be set equal to the total defect length $L_d$.

Scalar multiplier 318 scales the defect average $W_{m,c}$ by specified scale factor $\alpha_2$. Classification block 320 generates binary classification flag $C[n]$ according to Equation (11) as follows:

$$C = \begin{cases} 1 & \text{if } (Z_{m,c} < \alpha_2 \cdot W_{m,c}) \\ 0 & \text{otherwise} \end{cases} \quad (11)$$

where $0<\alpha_2<1$. In particular, $C=1$ implies that the defect region is an MD region, and $C=0$ implies that the defect region is a TA region. In one implementation, the scale factor $\alpha_2$ is set to 0.2.

For MD regions, the average $W_{m,c}$ for the 2T DFT component is larger than the average $Z_{m,c}$ for the DC DFT component, since the occurrence of drop-out type MD manifests predominantly as attenuation of the signal. As such, for an MD region, the inequality in Equation (11) will be satisfied. On the other hand, for TA regions, the average $W_{m,c}$ for the 2T DFT component will be smaller than the average $Z_{m,c}$ for the DC DFT component because of the presence of the DC frequency component introduced by TA. As such, for a TA region, the inequality in Equation (11) will not be satisfied. In TMR-TA regions, the 2T DFT component will be attenuated by the drop-out effect, and the DC DFT component will be enhanced, whereas, in GMR-TA regions, the DC DFT component is significantly enhanced by the strong baseline shift.

In one possible implementation of MD/TA D&C subsystem 150, when the gap between the end of one defect region and the beginning of the next defect region is less than a specified distance apart, then the two defect regions and the intervening normal region are merged into one combined defect region for classification processing, where the combined defect region spans from the beginning of the first defect region until the end of the second defect region.

Although the present invention has been described in the context of a read channel for a TMR (tunneling magneto-resistive) read head, those skilled in the art will appreciate that the present invention can be implemented in the context of other types of read heads.

Although the invention has been described in the context of DFT processing, the invention might be able to be implemented using other frequency-based transforms.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A machine-implemented method for detecting or classifying a defect region on a hard disc, the method comprising:
    (a) receiving signal values corresponding to data stored on the hard disc in a data pattern having a first data frequency;
    (b) generating a first measure corresponding to the first data frequency;
    (c) generating a second measure corresponding to a second data frequency different from the first data frequency; and
    (d) detecting or classifying the defect region based on the first measure and the second measure.

2. The invention of claim 1, wherein the signal values are analog-to-digital converter (ADC) output signal values generated by an ADC of a read channel associated with the hard disc.

3. The invention of claim 1, wherein the signal values are equalizer output signal values generated by an equalizer of a read channel associated with the hard disc.

4. The invention of claim 1, wherein:
    the first measure is a first discrete Fourier transform (DFT) measure at the first data frequency; and
    the second measure is a second DFT measure at the second data frequency.

5. The invention of claim 4, wherein the first DFT measure and the second DFT measure are both generated using DFTs of the same size.

6. The invention of claim 1, wherein the second data frequency is a DC data frequency.

7. The invention of claim 1, wherein the first data frequency is a 2T data frequency.

8. The invention of claim 1, wherein step (d) comprises detecting location of the defect region on the hard disc based on the first measure and the second measure.

9. The invention of claim 8, wherein step (d) further comprises classifying the defect region on the hard disc as being associated with thermal asperity (TA) or drop-out media defect (MD) based on the first measure and the second measure.

10. The invention of claim 8, wherein:
    step (b) comprises generating (i) a first average strength value of a first-data-frequency component of the signal values corresponding to the defect region and (ii) a second average strength value of the first-data-frequency component corresponding to one or more defect-free regions on the hard disc;
    step (c) comprises generating (i) a first average strength value of a second-data-frequency component of the signal values corresponding to the defect region and (ii) a second average strength value of the second-data-frequency component corresponding to one or more defect-free regions on the hard disc; and
    step (d) comprises:
        (d1) comparing the first and second average strength values of the first-data-frequency component;
        (d2) comparing the first and second average strength values of the second-data-frequency component; and
        (d3) detecting the location of the defect region on the hard disc based on the comparisons of steps (d1) and (d2).

11. The invention of claim 10, wherein step (d3) comprises detecting the location of the defect region on the hard disc if either the comparison of step (d1) or the comparison of step (d2) is true.

12. The invention of claim 10, wherein:
    step (d1) comprises determining whether the first average strength value of the first-data-frequency component is less than a specified first fraction of the second average strength value of the first-data-frequency component, wherein the specified first fraction is less than one; and
    step (d2) comprises determining whether the first average strength value of the second-data-frequency component is greater than a specified second fraction of the second average strength value of the second-data-frequency component, wherein the specified second fraction is less than one.

13. The invention of claim 1, wherein step (d) comprises classifying the defect region on the hard disc as being associated with thermal asperity (TA) or drop-out media defect (MD) based on the first measure and the second measure.

14. The invention of claim 13, wherein:
    step (b) comprises generating an average strength value of a first-data-frequency component of the signal values corresponding to the defect region;
    step (c) comprises generating an average strength value of a second-data-frequency component of the signal values corresponding to the defect region; and
    step (d) comprises:
        (d1) comparing the average strength value of the first-data-frequency component and the average strength value of the second-data-frequency component; and
        (d2) classifying the defect region on the hard disc as being associated with TA or MD based on the comparison of step (d1).

15. The invention of claim 14, wherein:
    step (d1) comprises determining whether the average strength value of the first-data-frequency component is less than a specified fraction of the average strength value of the second-data-frequency component, wherein the specified fraction is less than one.

16. The invention of claim 1, wherein the processor is adapted to:

(d1) detect location of the defect region on the hard disc based on the first measure and the second measure; and (d2) classify the defect region on the hard disc as being associated with thermal asperity (TA) or drop-out media defect (MD) based on the first measure and the second measure.

17. Apparatus for detecting or classifying a defect region on a hard disc, the apparatus comprising:

(a) means for receiving signal values corresponding to data stored on the hard disc in a data pattern having a first data frequency;

(b) means for generating a first measure corresponding to the first data frequency;

(c) means for generating a second measure corresponding to a second data frequency different from the first data frequency; and (d) means for detecting or classifying the defect region based on the first measure and the second measure.

18. A non-transitory machine-readable storage medium, having encoded thereon program code, wherein, when the program code is executed by a machine, the machine implements a method for detecting or classifying a defect region on a hard disc, comprising the steps of:

(a) receiving signal values corresponding to data stored on the hard disc in a data pattern having a first data frequency;

(b) generating a first measure corresponding to the first data frequency;

(c) generating a second measure corresponding to a second data frequency different from the first data frequency; and (d) detecting or classifying the defect region based on the first measure and the second measure.

19. A read channel for a hard disc, the read channel comprising:

analog circuitry adapted to generate an analog signal corresponding to data stored on the hard disc;

an analog-to-digital converter (ADC) adapted to convert the analog signal into a digital signal; and digital circuitry adapted to generate recovered data from the digital signal, wherein the digital circuitry comprises a processor adapted to:

(a) receive signal values corresponding to the data stored on the hard disc in a data pattern having a first data frequency;

(b) generate a first measure corresponding to the first data frequency;

(c) generate a second measure corresponding to a second data frequency different from the first data frequency; and (d) detect or classify a defect region on the hard disc based on the first measure and the second measure.

20. The invention of claim 19, wherein the signal values are either (1) ADC output signal values generated by the ADC or (2) equalizer output signal values generated by an equalizer of the digital circuitry.

21. The invention of claim 19, wherein:

the first measure is a first discrete Fourier transform (DFT) measure at the first data frequency; and the second measure is a second DFT measure at the second data frequency.

22. The invention of claim 21, wherein the first DFT measure and the second DFT measure are both generated using DFTs of the same size.

23. The invention of claim 19, wherein the second data frequency is a DC data frequency.

* * * * *